United States Patent
Eggleston et al.

(10) Patent No.: US 8,689,941 B2
(45) Date of Patent: Apr. 8, 2014

(54) LUBRICATING APPARATUS AND METHODS FOR LUBRICATING VEHICLE PANEL ASSEMBLIES FOR VEHICLE INSTALLATION

(75) Inventors: Todd N. Eggleston, Georgetown, KY (US); David R. Morgan, Georgetown, KY (US); Patrick D. Behrens, Georgetown, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 192 days.

(21) Appl. No.: 13/041,489

(22) Filed: Mar. 7, 2011

(65) Prior Publication Data

US 2012/0231172 A1    Sep. 13, 2012

(51) Int. Cl.
F16N 7/38 (2006.01)
F16N 39/00 (2006.01)
F01M 11/00 (2006.01)
F01M 11/02 (2006.01)
B05D 1/02 (2006.01)

(52) U.S. Cl.
USPC .......... 184/26; 184/6.21; 184/6.28; 184/11.2; 427/427.1

(58) Field of Classification Search
USPC ........ 184/26, 28, 6.21, 6.26, 6.28, 11.1, 11.2; 427/421.1, 427.1, 427.2
See application file for complete search history.

(56) References Cited

U.S. PATENT DOCUMENTS

| | | | |
|---|---|---|---|
| 1,205,711 A | 11/1916 | Clark | |
| 1,728,412 A | 9/1929 | Humphries | |
| 1,992,977 A | 3/1935 | Drake | |
| 2,016,316 A | 10/1935 | Collins | |
| 2,173,654 A | 9/1939 | Moore | |
| 2,207,452 A * | 7/1940 | Bingman | 134/99.1 |
| 2,579,575 A * | 12/1951 | Herdlein | 134/114 |
| 2,756,467 A * | 7/1956 | Etling | 428/34 |
| 2,877,511 A * | 3/1959 | Viola, Jr. | 49/413 |
| 2,898,647 A | 8/1959 | Bush et al. | |
| 3,444,867 A * | 5/1969 | Thornton | 134/123 |
| 3,559,227 A * | 2/1971 | Schleicher | 15/250.04 |
| 3,698,029 A * | 10/1972 | Pulliam | 15/88.3 |
| 4,004,370 A * | 1/1977 | Heaney | 49/70 |
| 4,338,958 A * | 7/1982 | Fujita | 134/104.2 |
| 4,421,798 A * | 12/1983 | Lin | 427/209 |
| 4,551,376 A | 11/1985 | Kessler | |
| 4,844,203 A * | 7/1989 | Brown et al. | 184/15.3 |
| 5,078,089 A * | 1/1992 | Dugan et al. | 118/687 |
| 5,755,246 A * | 5/1998 | Carl et al. | 134/73 |
| 6,474,104 B1 | 11/2002 | Campbell et al. | |
| 7,125,462 B2 | 10/2006 | Disteldorf | |
| 7,157,122 B2 * | 1/2007 | Strebe | 427/424 |
| 7,516,967 B2 * | 4/2009 | Schwei et al. | 280/79.2 |
| 7,569,037 B1 * | 8/2009 | Spivak | 604/289 |
| 7,979,941 B2 * | 7/2011 | Arrington | 15/56 |
| 2002/0056184 A1 | 5/2002 | Richardson et al. | |
| 2004/0031507 A1 * | 2/2004 | Ross et al. | 134/123 |
| 2007/0275245 A1 | 11/2007 | Persson et al. | |

* cited by examiner

Primary Examiner — William E Dondero
Assistant Examiner — Minh Truong
(74) Attorney, Agent, or Firm — Dinsmore & Shohl LLP

(57) ABSTRACT

A lubricating apparatus for lubricating a panel assembly prior to vehicle installation includes a lubricating jig assembly. The lubricating jig assembly includes a front guard wall and a rear guard wall connected to the front guard wall defining a panel receiving volume therebetween. At least one nozzle opening is located in the receiving volume. A pump is fluidly connected to the at least one nozzle opening for delivering a lubricant fluid thereto. A lubricant reservoir is in fluid communication with the receiving volume.

20 Claims, 5 Drawing Sheets

LUBRICATING APPARATUS AND METHODS FOR LUBRICATING VEHICLE PANEL ASSEMBLIES FOR VEHICLE INSTALLATION

TECHNICAL FIELD

The present specification generally relates to lubricating apparatus and methods for lubricating vehicle panel assemblies for vehicle installation.

BACKGROUND

Various vehicle panels are frequently installed manually. A number of techniques may be used to connect the vehicle panels to the various vehicle structures. As one example, quarter glass panel assemblies may be slid into place manually within a door frame. Because of the various seals, friction fittings and weather strips around the door area, it can be somewhat physically demanding to slide the quarter glass panel into its position within the door assembly. Accordingly, there is a need for apparatus and methods of reducing the physical demand during vehicle assembly.

SUMMARY

In one embodiment, a lubricating apparatus for lubricating a panel assembly prior to vehicle installation includes a lubricating jig assembly. The lubricating jig assembly includes a front guard wall and a rear guard wall connected to the front guard wall defining a panel receiving volume therebetween. At least one nozzle opening is located in the receiving volume. A pump is fluidly connected to the at least one nozzle opening for delivering a lubricant fluid thereto. A lubricant reservoir is in fluid communication with the receiving volume.

In another embodiment, a method of lubricating a panel assembly comprising: inserting the panel assembly into a panel receiving volume of a lubricating jig assembly, the lubricating jig assembly including a nozzle opening in the panel receiving volume; delivering a lubricant fluid to the nozzle opening for delivery to the panel assembly; and returning the lubricant fluid to a lubricant reservoir from the panel receiving volume.

In another embodiment, a lubricating apparatus for lubricating a quarter glass panel assembly includes a lubricating jig assembly comprising a panel receiving volume including the quarter glass panel assembly located therein. The lubricating jig assembly includes at least one nozzle opening that directs a lubricant fluid onto the quarter glass panel assembly. A pump is fluidly connected to the at least one nozzle opening for delivering the lubricant fluid thereto.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to lubricating apparatus and methods for lubricating one or more sides of a panel assembly for vehicle installation. In particular, the lubricating apparatus and methods may be used to lubricate multiple sides of a quarter glass panel assembly with a soap or other lubricant to reduce the manual burden on the installer during assembly. The lubricating apparatus may include one or more nozzles that apply the lubricant to the quarter glass panel assembly as the quarter glass panel assembly is inserted into a holding volume of the lubricating apparatus.

Figure 1:
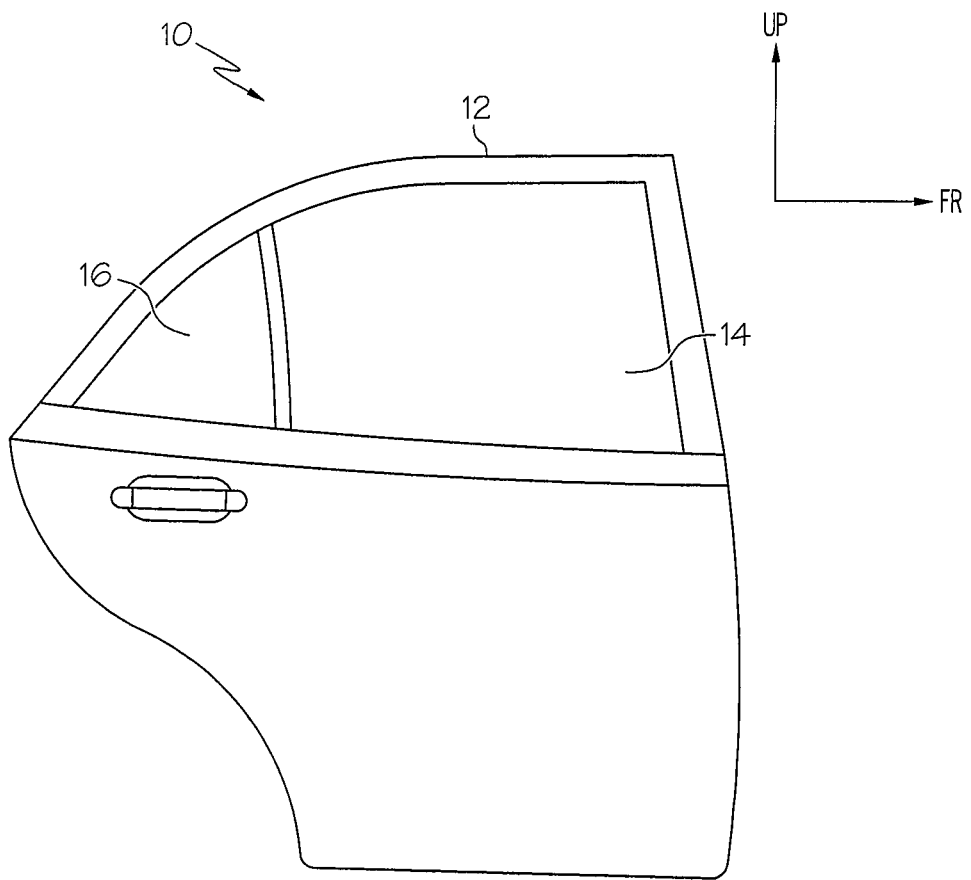
FIG. 1 is a side door assembly including a quarter glass panel assembly according to one or more embodiments described herein.

Referring to FIG. 1, a front view of a rear door assembly 10 of a vehicle, as viewed from the right side of the vehicle is shown that includes a door frame 12, a rear door glass 14 and a quarter glass panel assembly 16. The rear door assembly 12 may be the same or similar to those rear door assemblies on the left side of the vehicle. For simplicity, however, only the rear door assembly 10 on the right side of the vehicle is shown. Also, the direction toward the front of the vehicle is indicated by the arrow FR and the direction up with respect to the vehicle is indicated by the arrow UP.

Figure 2:
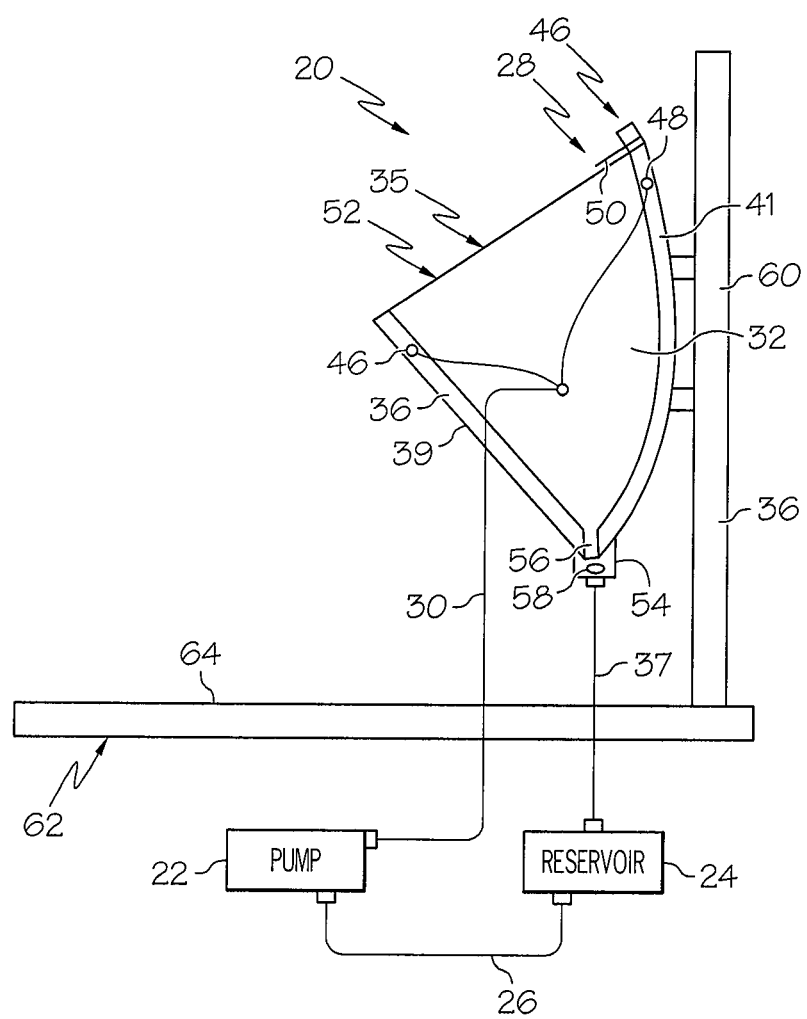
FIG. 2 is a side view of a lubricating apparatus for use in lubricating multiple sides of the quarter glass panel assembly of FIG. 1 according to one or more embodiments described herein.

As indicated above, the quarter glass panel assembly 16 may be slid or otherwise located in the illustrated position manually during installation. Referring to FIG. 2, a lubricating apparatus 20 may be used to lubricate one or more side edges of the quarter glass panel assembly 16 prior to its installation in the door frame 12. The lubricating apparatus 20 generally includes a pump 22 (e.g., a pneumatic pump) that is used to pump lubricant from a lubricant reservoir 24 through line 26 (e.g., a hose) to a lubricating jig assembly 28 through line 30. The lubricant reservoir 24 is fluidly connected to the lubricating jig assembly 28 through line 37.

Figure 3:
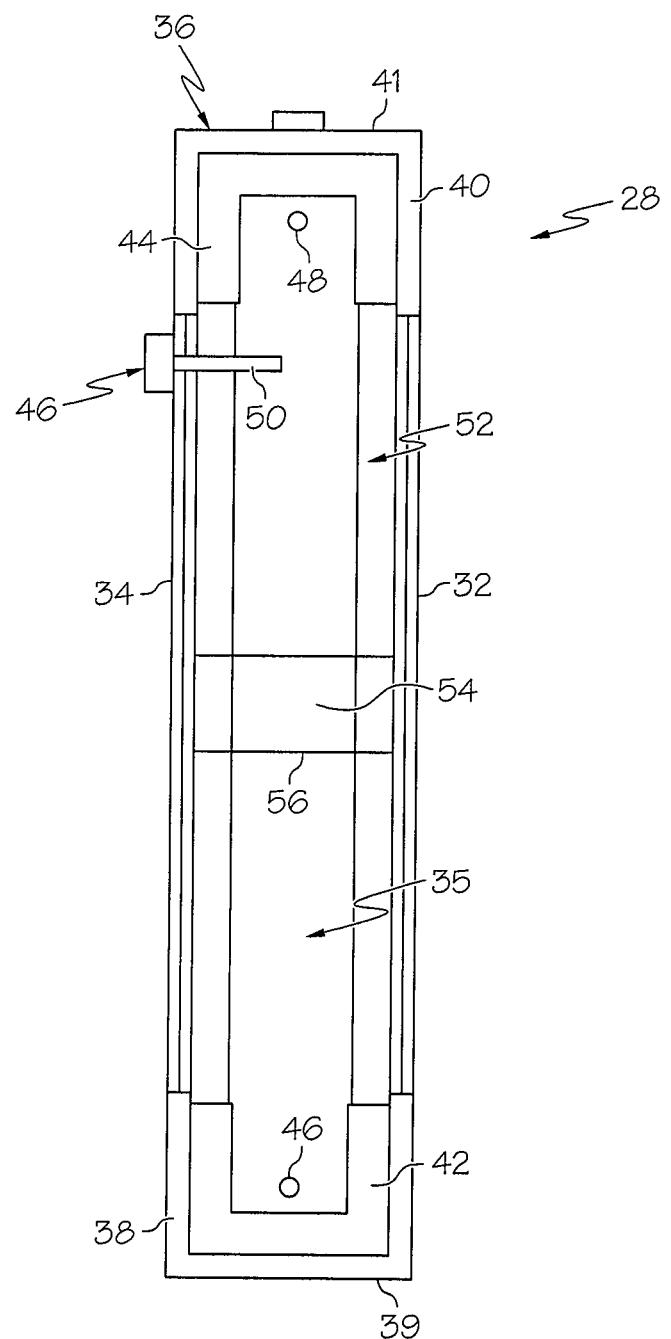
FIG. 3 is a top view of a lubricating jig assembly for use with the lubricating apparatus of FIG. 2 according to one or more embodiments described herein.

Referring also to FIG. 3, the lubricating jig assembly 28 includes a front guard wall 32 and a rear guard wall 34 that faces the front guard wall 32. The front guard wall 32 and the rear guard wall 34 form relatively broad front and rear faces, respectively, with relatively narrow sides 39 and 41 extending therebetween. The front guard wall 32 and rear guard wall 34 are spaced apart to form a panel receiving volume 35. In some embodiments, one or both of the front and rear guard walls 32 and 34 may be formed of a transparent or semi-transparent material (e.g., a transparent plastic material) to allow viewing through the front and/or rear guard walls 32 and 34 during use. The front and rear guard walls 32 and 34 may be supported by a frame assembly 36. As can be seen by FIG. 3, the frame assembly 36 may be formed using two U-shaped channel members 38 and 40 that are each connected to the front and rear guard walls 32 and 34. The two channel members 38 and 40 may be formed of any suitable material, such as metals (e.g., steel or aluminum) or plastic.

Panel receiving channels 42 and 44 may be received by the channel members 38 and 40. Any suitable shape may be employed for the panel receiving channels 38 and 40. In the illustrated embodiment, the panel receiving channels 42 and 44 are both U-shaped and sized to receive an edge of the quarter panel assembly. Nozzle openings 46 and 48 may be provided in the panel receiving channels 42 and 44. The nozzle openings 46 and 48 may be sized to receive an end of the line 30. While the line 30 is shown being split in FIG. 2, two lines may run separately from the pump 22 to each of the nozzle openings 46 and 48. Additionally, there may be more than (or less than) two nozzle openings 46 and 48 with corresponding lines.

The panel receiving channels 42 and 44 may be formed of any suitable material. In some embodiments, the panel receiving channels 42 and 44 may be formed of a relatively low friction material such as nylon. The panel receiving channels 42 and 44 may be friction fit within the channel members 38 and 40 and/or they may be fastened to the channel members 38 and 40 such as using bolts or other fasteners.

A detector mechanism 46 may be provided for detecting the presence of the quarter glass panel assembly 16. In the illustrated embodiment, the detector mechanism 46 is a limit switch that is used to activate the pump 22. The detector mechanism 46 includes an actuation lever 50 that overhangs the opening 52 between the front and rear guard walls 32 and 34. In other embodiments, the detector mechanism 46 may be some other type of sensor such as a photo eye that is used to activate the pump 22 when presence of the quarter glass panel assembly 16 is detected. The detector mechanism 46 may be connected to a controller, which in turn may activate the pump 22, or the detector mechanism 46 may switch the pump 22 on and off directly. As will be described in greater detail below, upon detection of the quarter glass panel assembly 16, the detector mechanism 46 activates the pump 22, which causes lubricant to be delivered through the nozzle openings 46 and 48 and to multiple side edges of the quarter glass panel assembly 16. In other embodiments, a switch (e.g., button, foot pedal, etc.) may be used to activate the pump 22.

In some embodiments, the lubricating jig assembly 28 includes a catch basin 54 that is in communication with the panel receiving volume 35 via an opening 56 formed between the front and rear guard walls 32 and 34. An openable hatch 58 (FIG. 2) may be formed in the side of the catch basin 54. The openable hatch 58 may be closed by a door, plug or other piece of material that may be removed or opened to gain access to the catch basin 54. The catch basin 54 may provide a volume in which a loose part or piece of material may fall into and be removed.

As shown in FIG. 2, the lubricating jig assembly 28 is mounted to a mounting structure 60. In some embodiments, the mounting structure 60 may be part of a table or a moveable cart 62, as examples. The moveable cart 62 may include wheels or other structure that facilitates moving of the moveable cart 62. In some embodiments, a table 64 may be provided. The table 64 may provide a location to support other components for vehicle installation such as fasteners, panel assemblies, tools, etc. In some embodiments, the moveable cart 62 may also support the pump 22 and reservoir 24 thereon as well such that the pump 22 and reservoir 24 are moveable with the moveable cart 62.

Figure 4:
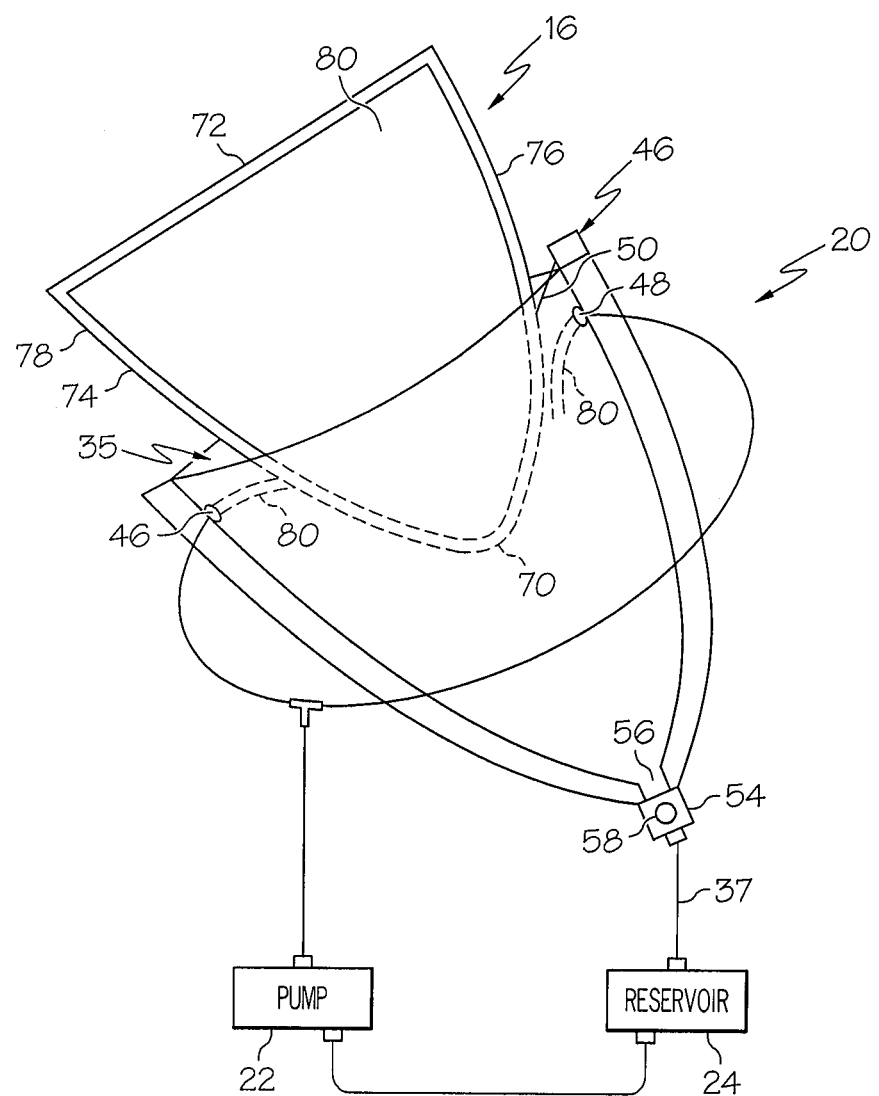
FIG. 4 is a side view illustrating a lubricating operation using the lubricating apparatus of FIG. 2 according to one or more embodiments described herein.

Referring now to FIG. 4, a lubricating operation is illustrated using the lubricating apparatus 20. The quarter glass panel assembly 16 includes a rear-facing end 70, a front-facing side 72, a top side 74 and a bottom side 76. A quarter glass seal 78 extends about at least part of the periphery of a quarter glass panel 80. In the illustrated embodiment, the quarter glass seal 78 extends along the rear-facing end 70, front-facing side 72, top side 74 and bottom side 78.

As the quarter glass panel assembly 16 is inserted into the panel receiving volume 35 (e.g., manually or automatically using a machine), the bottom side 76 contacts the actuation lever 50 of the detector mechanism 46. A signal from the detector mechanism 46 then activates the pump 22, which pumps lubrication fluid from the lubricant reservoir 24. The lubrication fluid is then pumped through the nozzle openings 46 and 48 in the form of a spray or stream 80. In some embodiments, the stream 80 may be directed outwardly toward the quarter glass panel assembly 16 and/or the stream 80 may be directed down the panel receiving channels 42 and 44. The panel receiving channels 42 and 44 are sized to receive the top side 74 and the bottom side 78 of the quarter glass panel assembly 16.

As can be seen, the panel receiving volume 35 is shaped similarly (e.g., triangular in shape) as the shape of the quarter glass panel assembly 16. In some embodiments, the panel receiving volume 35 is sized such that all of the quarter glass panel assembly 16 may be received within the panel receiving volume 35. In some of these embodiments, the front-facing side 72 may pass the actuation lever 50 once the entire quarter glass assembly 16 is received within the panel receiving volume 35. In these embodiments, the pump 22 may discontinue pumping lubrication fluid once the detector mechanism 46 is no longer actuated. In other embodiments, the pump 22 may activate for a predetermined period of time (e.g., using a timing device). Removing the quarter glass panel assembly 16 from the receiving volume 35 may again actuate the detector mechanism 46, which again activates the pump 22 as the quarter glass panel assembly 16 is removed. Thus, multiple streams or sprays of lubricant fluid may be directed or delivered to the top side 74 and bottom side 78 of the quarter glass panel assembly 16 as it is entered and removed from the panel receiving volume 35.

Lubricant fluid not remaining on the quarter glass panel assembly 16 may exit the panel receiving volume 35 through the opening 56. The lubricant fluid may then enter the catch basin 54 and outlet through the line 37. The line 37 may then direct the lubricant fluid (e.g., using gravity) to the lubricant reservoir 24 for reuse. If a material or part falls into the catch basin 54, that material or part can be removed from the catch basin 54 through the openable hatch 58.

Figure 5:
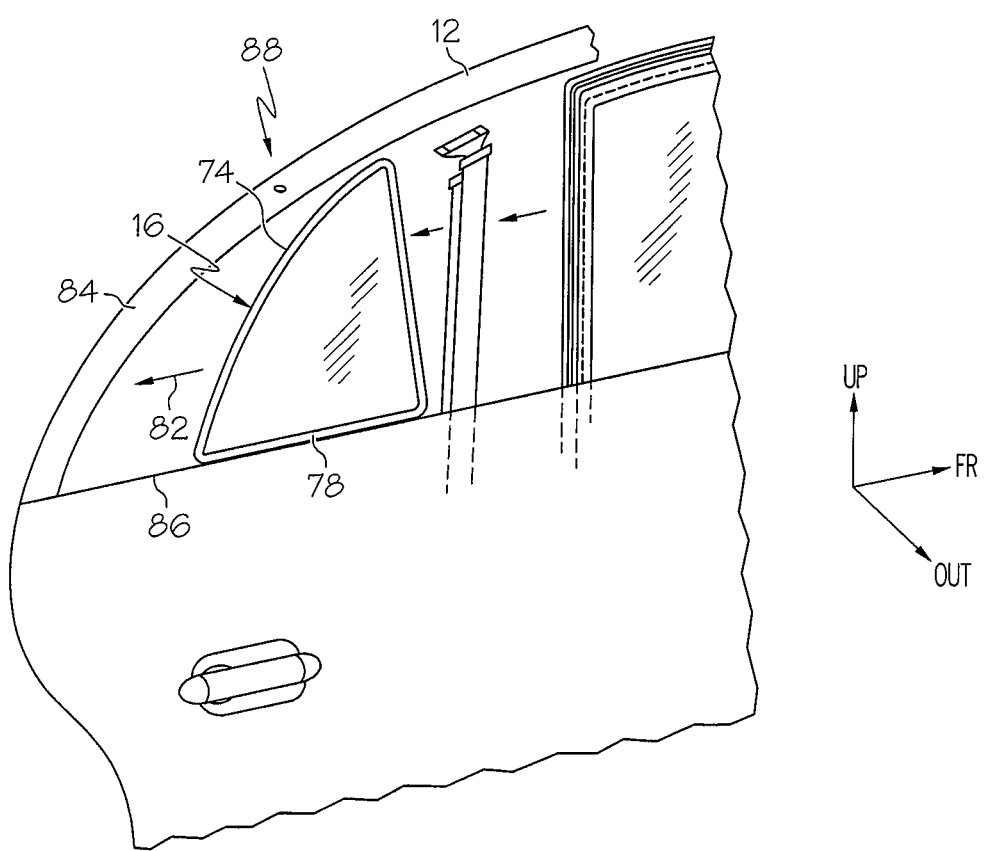
FIG. 5 is a side view of the door assembly of FIG. 1 with the quarter glass panel assembly being installed after the lubricating operation.

Referring now to FIG. 5, once the top side 74 and the bottom side 78 are lubricated using the lubricating apparatus 10, the quarter glass panel assembly 16 is placed (e.g., manually or mechanically using a machine) into the door frame 12. As can be seen by arrow 82, the quarter glass panel assembly 16 is slid along frame tray members 84 and 86 and held into place until a fastener 88 is used to secure the quarter glass panel assembly 16 in the door frame 12 (FIG. 1).

The lubricating apparatus 20 described above may be used to lubricate multiple sides of the quarter glass panel assembly with a soap or other lubricant to reduce the manual burden on the installer during assembly. While a quarter glass panel assembly is described above, the lubricating apparatus may be used to lubricate multiple sides of other panel types.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A lubricating apparatus for lubricating a panel assembly prior to vehicle installation, the lubricating apparatus comprising:
a lubricating jig assembly comprising:
a front guard wall;
a rear guard wall connected to the front guard wall defining a panel receiving volume therebetween and an opening that provides access to the receiving volume; and
at least one nozzle opening located in panel receiving channels being U-shaped and extending along the panel receiving volume, away from the opening to receive a side of the panel assembly therein and guide the panel assembly into the panel receiving volume;
a pump fluidly connected to the at least one nozzle opening for delivering a lubricant fluid thereto;
a lubricant reservoir in fluid communication with the receiving volume; and
a detector mechanism comprising an actuation lever at least partially obstructing the receiving volume that is actuated as the panel assembly is inserted into the receiving volume by deflecting the actuation lever to detect presence of the panel assembly, the pump activates upon detection of the panel assembly by the detector mechanism.

2. The lubricating apparatus of claim 1 comprising a pair of panel receiving channels including the panel receiving channel, the pair of panel receiving channels located at sides of the lubricating jig assembly, the front guard wall and rear guard wall extending between the pair of panel receiving channels, the pair of panel receiving channels being U-shaped and sized and located to receive sides of the panel assembly therein and guide the panel assembly into the receiving volume.

3. The lubricating apparatus of claim 2, wherein each of the panel receiving channels has a nozzle opening located therein.

4. The lubricating apparatus of claim 1, wherein the pump is fluidly connected to the lubricant reservoir.

5. The lubricating apparatus of claim 1, wherein the panel receiving volume is sized and shaped to receive a quarter glass panel assembly.

6. The lubricating apparatus of claim 1, wherein the lubricating jig assembly further comprises a frame assembly that connects the front guard wall and rear guard wall.

7. The lubricating apparatus of claim 1, wherein the lubricating jig assembly further comprises a catch basin, the lubricant reservoir being connected to the catch basin.

8. The lubricating apparatus of claim 1, wherein at least one of the front guard wall and the rear guard wall is formed of a transparent material.

9. The lubricating apparatus of claim 1 further comprising a mounting structure to which the lubricating jig assembly is mounted.

10. The lubricating apparatus of claim 1, wherein the receiving volume and the panel assembly are both substantially triangular in shape.

11. A lubricating apparatus for lubricating a panel assembly prior to vehicle installation, the lubricating apparatus comprising:
a lubricating jig assembly comprising:
a front guard wall;
a rear guard wall connected to the front guard wall defining a panel receiving volume therebetween and an opening that provides access to the receiving volume;
at least one nozzle opening located in the receiving volume; and
panel receiving channels located at sides of the lubricating jig assembly, the front guard wall and rear guard wall extending between the panel receiving channels, the panel receiving channels being U-shaped and extend along the receiving volume in a direction away from the opening to receive sides of the panel assembly therein and guide the panel assembly into the receiving volume;
a pump fluidly connected to the at least one nozzle opening for delivering a lubricant fluid thereto; and
a lubricant reservoir in fluid communication with the receiving volume.

12. The lubricating apparatus of claim 11, wherein the pump is fluidly connected to the lubricant reservoir.

13. The lubricating apparatus of claim 11, wherein the panel receiving volume is sized and shaped to receive a quarter glass panel assembly.

14. The lubricating apparatus of claim 11, wherein the lubricating jig assembly further comprises a frame assembly that connects the front guard wall and rear guard wall.

15. The lubricating apparatus of claim 11, wherein the lubricating jig assembly further comprises a catch basin, the lubricant reservoir being connected to the catch basin.

16. The lubricating apparatus of claim 11, wherein at least one of the front guard wall and the rear guard wall is formed of a transparent material.

17. The lubricating apparatus of claim 11 further comprising a mounting structure to which the lubricating jig assembly is mounted.

18. The lubricating apparatus of claim 17, wherein the mounting structure is part of a moveable cart.

19. The lubricating apparatus of claim 11, wherein the lubricating jig assembly comprises a detector mechanism that detects presence of a panel assembly being inserted into the panel receiving volume and activates the pump for a lubricating operation.

20. The lubricating apparatus of claim 11, wherein the receiving volume and the panel assembly are both substantially triangular in shape.

* * * * *